Sept. 2, 1924.
L. PIERCE
PIPE UNION
Filed Jan. 8, 1924
1,507,138
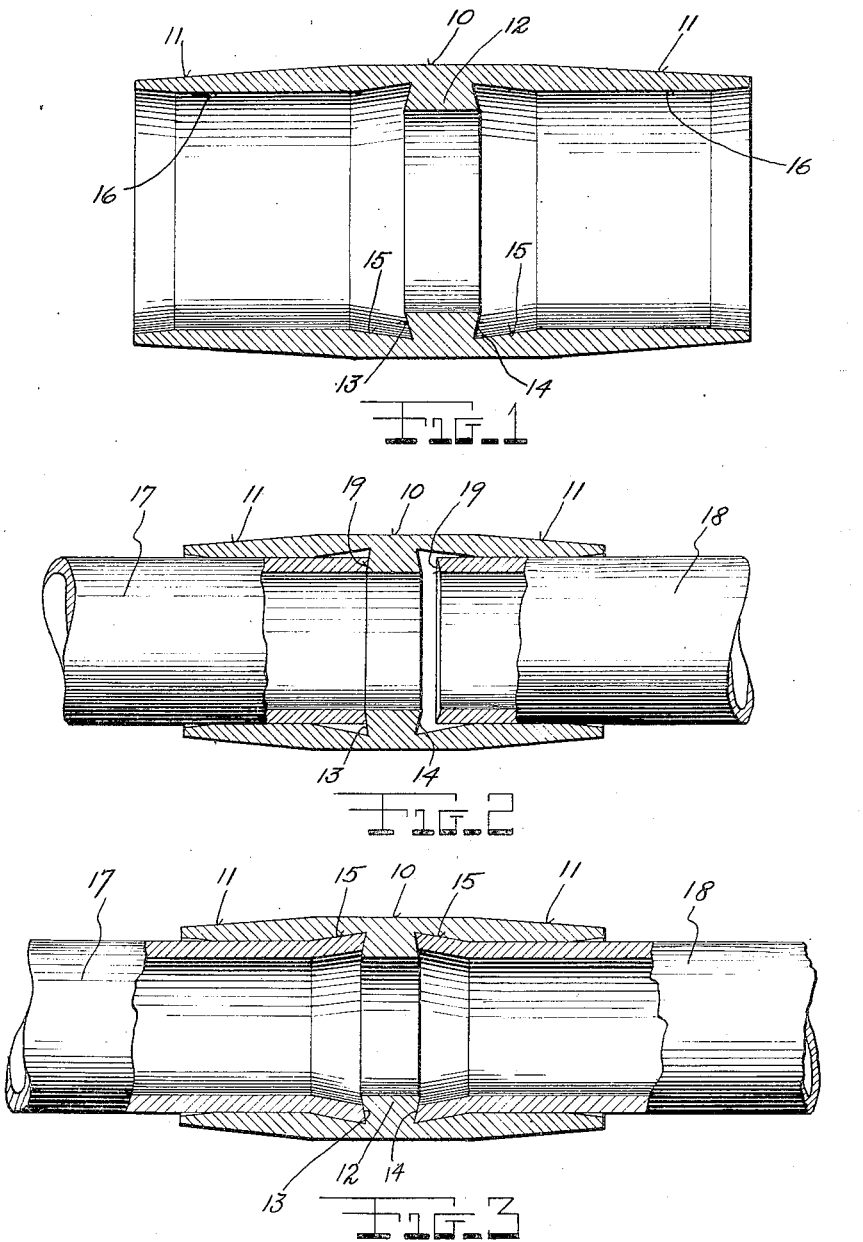
INVENTOR
*L. Pierce*
BY
ATTORNEY Patented Sept. 2, 1924.

1,507,138

UNITED STATES PATENT OFFICE.

LEON PIERCE, OF NEW YORK, N. Y.

PIPE UNION.

Application filed January 8, 1924. Serial No. 684,935.

*To all whom it may concern:*

Be it known that I, LEON PIERCE, a citizen of the United States, residing at New York, in the county of the Bronx and State of New York, have invented certain new and useful Improvements in Pipe Unions, of which the following is a specification.

The main object of this invention is to provide a sleeve or union at the mutually adjacent ends of pipe, by means of which the pipes may be coupled and locked. The unions are used on any pipes, but are preferable for pipes used as piles.

Another object is to provide a pipe union into which the mutually adjacent ends of two pipes are inserted, the pipes, by being driven toward the union, being securely and permanently locked therein.

These and other objects will become apparent in the description below, in which characters of reference refer to like-named parts in the drawing.

Referring briefly to the drawing, Figure 1 is a longitudinal sectional view, taken substantially centrally thru the union.

Figure 2 is a similar but reduced view of the union, showing pipe sections inserted therein.

Figure 3 is a longitudinal sectional view of the union, showing the ends of pipe sections locked in place therein.

Referring in detail to the drawing, the numeral 10 indicates the central periphery of the union fashioned as a sleeve and having the surfaces 11 adjacent the central portion 10 tapered lengthwise. An internal rim 12 is formed integral with the sleeve intermediate its length and the faces 13 and 14 on both sides of the rim are inclined downwardly. The major lengths 16 of the internal annular surface are of definite and aligned diameters, and the outer ends of these surfaces opposite to the rim 12, taper divergently outward. At the mutually adjacent ends of the surfaces 16, additional outwardly sloping annular surfaces 15 are formed, the latter forming acute angles with the faces 13 and 14. The pipes 17 and 18 illustrated in the several views, have edges faces 19 inclined outwardly and to a corresponding degree as the faces 13 and 14.

This type of union is designed mainly for use in the construction of hollow piles or for analogous purposes where a rigid fit is to be obtained. The piles may be constructed to their desired length before being applied, or they may be constructed as they are being applied. In constructing a pile, the pipes have their faces inclined at both ends as indicated by the numeral 19. Assuming that the pipe 17 is the first member being used, the union is slipped over its upper end until the inclined surface 19 of the pipe 17 rests upon the inclined surface of the face 13. By subjecting the upper open end of the union to concussive blows, the periphery of the tubing 17 will be expanded equally and entirely around its circumference until the outer periphery of the pipe 17 will rest upon the surface 15 of the union as illustrated on the left-hand side of Figure 3. As the diameter and circumference of the pipe is thus enlarged and becomes greater than the annular surfaces 16 of the union, the pipe is therefore rigidly connected to the union and may not be removed thru ordinary means. In joining an additional length of pipe 18 to the union, the same procedure is followed but the force is applied to the upper end of the pipe in order to expand the periphery of the lower end to lie adjacent the surfaces 14 and 15. Obviously, any other way of expanding the end of the pipe against the shoulder 13 may be employed. In case it is desired to have a releasable union, the wall 15 is left straight.

I claim:—

1. In combination with pipes having their end edges inclined, a union for joining adjacent ends of pipes comprising a hollow sleeve, an internal rim intermediate the length of the sleeve, the side faces of the rim serving as a stop for the ends of the pipes, the faces of the rim and the ends of the internal surfaces of the sleeve adjacent the rim being inclined to form an acute angle, the peripheries of the pipes being adapted to be expanded against the inclined faces of said sleeve.

2. A pipe union comprising a hollow cylindrical sleeve, an internal rim encircling the sleeve intermediate its length, downwardly inclined faces on the sides of the rim, and annular sloping surfaces extending from the outer edge of the inclined faces forming an acute angle with the inclined faces of the rim.

3. The combination of a pair of pipes and a union for joining adjacent ends of the pipe, said union comprising a cylindrical sleeve, an internal rim in said sleeve, the faces of said rim being inclined downwardly, sloping annular surfaces in said rim joining the inclined faces of the rim and forming an acute angle, the edges of the pipes when urged toward the union being adapted to be increased circumferentially by being urged into contact with the annular sloping surfaces of the rim.

In testimony whereof I affix my signature.

LEON PIERCE.